US012772007B2

(12) United States Patent
Chen et al.

(10) Patent No.: US 12,772,007 B2
(45) Date of Patent: Oct. 20, 2026

(54) SPEAKER

(71) Applicant: AAC Microtech (Changzhou) Co., Ltd., Changzhou City (CN)

(72) Inventors: Zhizhu Chen, Changzhou (CN); Zhaoyu Yin, Changzhou (CN)

(73) Assignee: AAC Microtech (Changzhou) Co., Ltd., Changzhou City (CN)

( * ) Notice: Subject to any disclaimer, the term of this patent is extended or adjusted under 35 U.S.C. 154(b) by 142 days.

(21) Appl. No.: 19/007,589

(22) Filed: Jan. 2, 2025

(65) Prior Publication Data

US 2026/0046567 A1 Feb. 12, 2026

Related U.S. Application Data

(63) Continuation of application No. PCT/CN2024/110584, filed on Aug. 8, 2024.

(51) Int. Cl.

| | |
|---|---|
| ***H04R 9/06*** | (2006.01) |
| ***H04R 7/12*** | (2006.01) |
| ***H04R 7/18*** | (2006.01) |
| ***H04R 9/02*** | (2006.01) |

(52) U.S. Cl.

CPC ............. *H04R 9/025* (2013.01); *H04R 7/127* (2013.01); *H04R 7/18* (2013.01); *H04R 9/06* (2013.01); *H04R 2400/11* (2013.01)

(58) Field of Classification Search

CPC .......... H04R 9/025; H04R 7/127; H04R 7/18; H04R 9/06; H04R 2400/11

USPC .................................................. 381/412, 420

See application file for complete search history.

(56) References Cited

U.S. PATENT DOCUMENTS

| | | | | |
|---|---|---|---|---|
| 8,831,268 B2 * | 9/2014 | Yuan | H04R 9/025 | 381/388 |
| 11,743,652 B2 * | 8/2023 | Stojanovic | H04R 7/14 | 381/423 |
| 12,294,845 B2 * | 5/2025 | Xu | H04R 7/04 | |
| 12,464,289 B2 * | 11/2025 | Gong | H04R 9/025 | |

FOREIGN PATENT DOCUMENTS

| | | | |
|---|---|---|---|
| CN | 207968886 | * 10/2018 | H04R 7/16 |
| CN | 207968942 | * 10/2018 | H04R 9/02 |

* cited by examiner

*Primary Examiner* — William J Deane, Jr.

(74) *Attorney, Agent, or Firm* — Wiersch Law Group

(57) ABSTRACT

A speaker includes a frame, a vibration system, and a magnetic circuit system. The magnetic circuit system includes a lower plate, a main magnetic component, a secondary magnetic component, and an upper plate. The upper plate includes a main body, the main body includes two long axis sides and two short axis sides, the two long axis sides are opposite to each other, the two short axis sides are opposite to each other, the two long axis sides are fixed with the frame, at least one of the two short axial sides is provided with a first projection extending in a direction away from the main magnetic component, the first projection is fixed with the frame. Compared with the related art, the speaker disclosed by the present disclosure could get better stability and acoustic performance.

10 Claims, 5 Drawing Sheets

SPEAKER

FIELD OF THE INVENTION

The invention relates to the technical field of electro-acoustic transducers, in particular to speaker.

BACKGROUND

With the development of science and technology, portable electronic products, such as cell phones, handheld game consoles, navigation devices or handheld multimedia entertainment devices are widely used in people's daily life, and in these mobile electronic devices, voice playback device is an essential part of its internal, the voice quality directly affects the user's experience of the use of these mobile electronic devices. Therefore, the requirements for speakers are getting higher and higher.

A related speaker includes a frame, a vibration system fixed with the frame, and a magnetic circuit system driving the vibration system to vibrate. The magnetic circuit system includes an upper plate, only a long axis side of the upper plate is fixed with the frame, and a short axis side of the upper plate is suspended, which leads to poor strength of the short axis side, and is prone to damaging a magnet when it is dropped.

Therefore, it is desired to provide a novel speaker to solve the above problems.

SUMMARY

The present disclosure is to provide a speaker with good stability and good acoustic performance.

For achieving the object mentioned above, the present disclosure provides a speaker including a frame, a vibration system fixed with the frame, and a magnetic circuit system driving the vibration system to vibrate. The magnetic circuit system includes a lower plate, a main magnetic component fixed with the lower plate, a secondary magnetic component surrounding the main magnetic component for forming a magnetic gap, and an upper plate located on a side of the secondary magnetic component close to the vibration system and fixed with the frame. The upper plate includes a main body, the main body includes two long axis sides extending in a direction of a long axis of the speaker and two short axis sides extending in a direction of a short axis of the speaker, the two long axis sides are opposite to each other, the two short axis sides are opposite to each other, the two long axis sides are fixed with the frame, at least one of the two short axial sides is provided with a first projection extending in a direction away from the main magnetic component, the first projection is fixed with the frame.

Further, the secondary magnetic component includes a secondary magnetic body attached to the main body and a second projection extending from the secondary magnetic body in the direction away from the main magnetic component, the second projection is in correspondence with the first projection and attached to the first projection.

Further, the secondary magnetic body includes two first secondary magnetic segments corresponding to the two long axial sides and two second secondary magnetic segments corresponding to the two short axial sides, the second projection is provided on at least one of the two second secondary magnetic segments.

Further, the secondary magnetic body is a one-piece magnet with ring shaped.

Further, the lower plate includes a plate portion fixed with the secondary magnetic component and the main magnetic component, and a third projection extending from the plate portion in the direction away from the main magnetic component, the third projection is corresponding to the second projection and fixed and attached to the second projection.

Further, the frame includes an upper surface, a bottom surface opposite to the upper surface, and a side wall connecting the upper surface to the bottom surface, the first projection and the two long axial sides are fixed with the bottom surface.

Further, the frame further includes an avoiding portion recessed from the bottom surface to the upper surface for avoiding the first projection, the first projection is accommodated in the avoiding portion.

Further, the vibration system includes a diaphragm fixed with the frame and a voice coil driving the diaphragm to vibrate, the diaphragm includes a dome and a suspension surrounding the dome, one end of the voice coil is fixed with the dome and the other end is suspended in the magnetic gap.

Further, the vibration system further includes a flexible support member fixed with the bottom surface and electrically connected with the voice coil, the flexible support member includes two body portions located at opposite sides of the first projection in a direction of the two short axial sides, a connecting portion extending from an inner edge of one of the two body portions towards the dome, and a lead connecting portion extending from the connecting portion in a direction away from the body portion, the lead connecting portion is fixed with the dome.

Further, the dome further includes a supporting portion bending and extending from an outer edge of the dome to the magnetic circuit system, the supporting portion abuts against the body portion, the supporting portion includes an opening portion for avoiding the first projection, the first projection passes through the opening portion and is fixed with the bottom surface.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DESCRIPTION OF THE EMBODIMENTS

Figure 1:
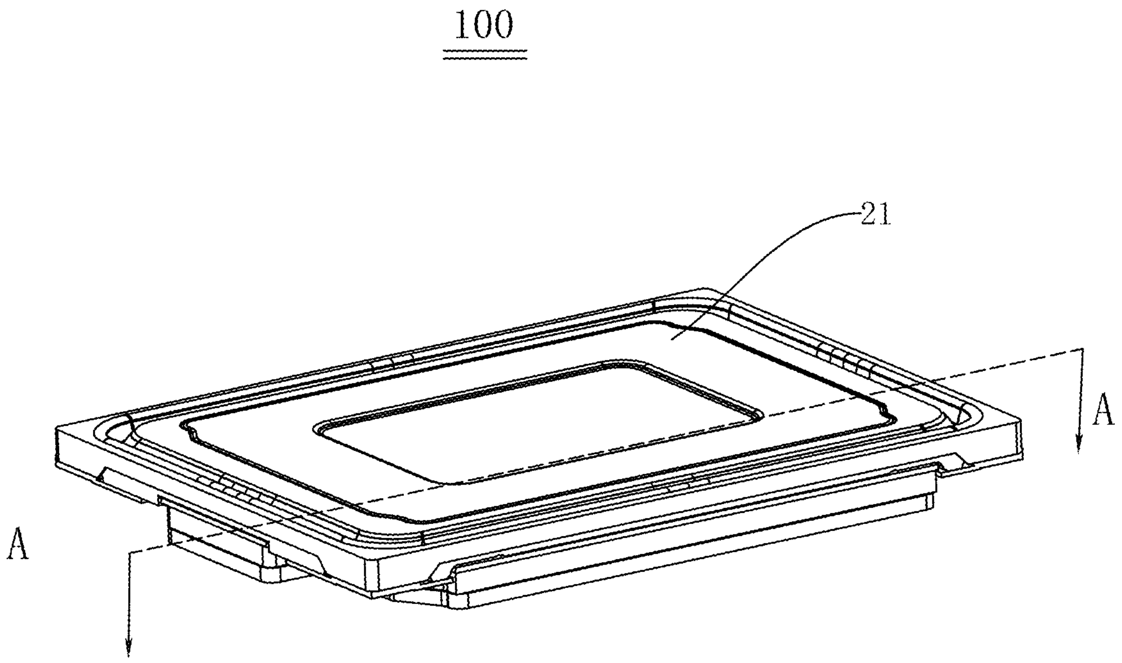
FIG. 1 is an isometric view of a speaker of the present disclosure.

The present disclosure will be further illustrated with reference to the accompanying drawings. It shall be noted that the elements of similar structures or functions are represented by like reference numerals throughout the figures. The embodiments described herein are not intended as an exhaustive illustration or description of various other embodiments or as a limitation on the scope of the claims or the scope of some other embodiments that are apparent to one of ordinary skills in the art in view of the embodiments described in the application. In addition, an illustrated embodiment need not have all the aspects or advantages shown.

As shown in the FIGS. 1-6, the present invention discloses a speaker 100, which includes a frame 1, a vibration system 2 fixed with the frame 1, and a magnetic circuit system 3 fixed with the frame 1 and driving the vibration system 2 to vibrate. The magnetic circuit system 3 includes a lower plate 31, a main magnetic component 32 fixed with the lower plate 31, a secondary magnetic component 34 surrounding the main magnetic component 32 for forming a magnetic gap 33, and an upper plate 35 located on a side of the secondary magnetic component 34 close to the vibration system 2 and fixed with the frame 1. The upper plate 35 includes a main body 351, the main body 351 includes two long axis sides 3511 extending in a direction of a long axis of the speaker 100 and two short axis sides 3512 extending in a direction of a short axis of the speaker 100, the two long axis sides 3511 are opposite to each other, the two short axis sides 3512 are opposite to each other, the two long axis sides 3511 are fixed with the frame 1. As shown in the FIGS. 4-5, at least one of the two short axial sides 3512 is provided with a first projection 352 extending in a direction away from the main magnetic component 32 and fixed with the frame 1. Therefore, it is possible to meet the demand for miniaturization and thinness of the speaker while improving the strength of the short axis of the speaker and effectively avoiding damage to the magnets caused by dropping the speaker.

Figure 2:
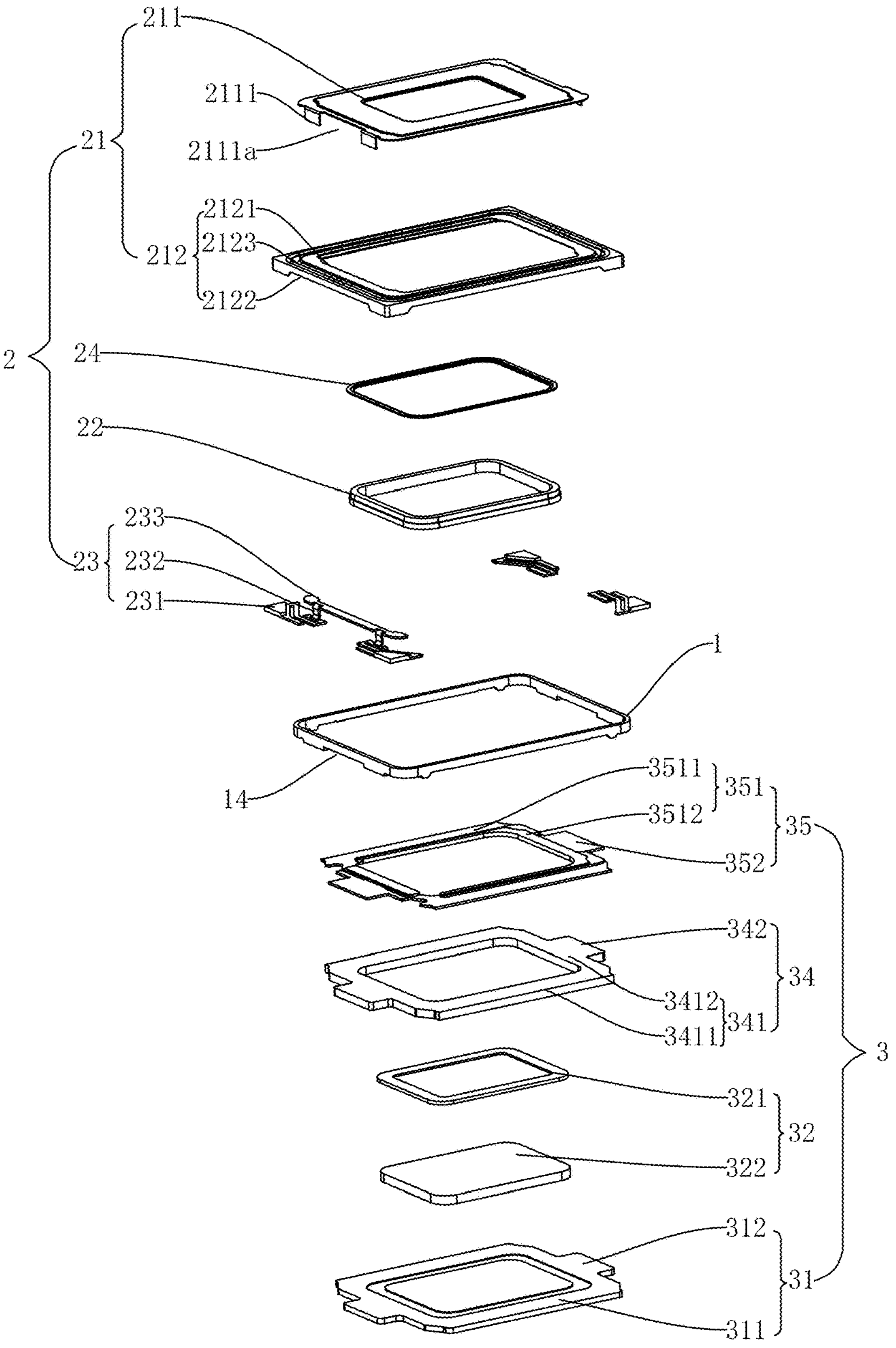
FIG. 2 is an exploded view of the speaker of the present disclosure.

As shown in FIG. 2, the secondary magnetic component 34 includes a secondary magnetic body 341 attached to the main body and a second projection 342 extending from the secondary magnetic component 341 in the direction away from the main magnetic component 32, the second projection 342 is in correspondence with the first projection 352 and attached to the first projection 352. By providing the second projection 342, the volume of the magnets in the magnetic circuit system and the BL could be increased, so that the sound generating performance of the speaker could be better.

Optionally, the secondary magnetic body 341 includes two first secondary magnetic segments 3411 corresponding to the two long axial sides 3511 and two second secondary magnetic segments 3412 corresponding to the two short axial sides 3512, the second projection 342 is provided on at least one of the two second secondary magnetic segments 3412. The secondary magnetic body 341 could be a one-piece magnet with ring shaped, and the second projection 342 may be provided on the one-piece magnet corresponding to the first projection 352.

The lower plate 31 includes a plate portion 311 fixed with the secondary magnetic component 34 and the main magnetic component 32, and a third projection 312 extending from the plate portion 311 in the direction away from the main magnetic component 32, the third projection 312 is corresponding to the second projection 342 and fixed and attached to the second projection 342.

The upper plate 35 is fixed with the frame 1 by welding, but it could also be fixed by other means such as gluing.

In addition, the main magnetic component 32 includes a main magnet 321 fixed with the lower plate 31 and a main pole plate 322 covered with the main magnet 321.

Optionally, the frame 1 includes an upper surface 11, a bottom surface 12 opposite to the upper surface 11, and a side wall 13 connecting the upper surface 11 to the bottom surface 12, the first projection 352 and the two long axial sides 3511 are fixed with the bottom surface 12. The frame 1 further includes an avoiding portion 14 recessed from the bottom surface 12 to the upper surface 11 for avoiding the first projection 352, the first projection 352 is accommodated in the avoiding portion 14. At least part of the secondary magnetic 34 is located in the avoiding portion 14.

Figure 3:
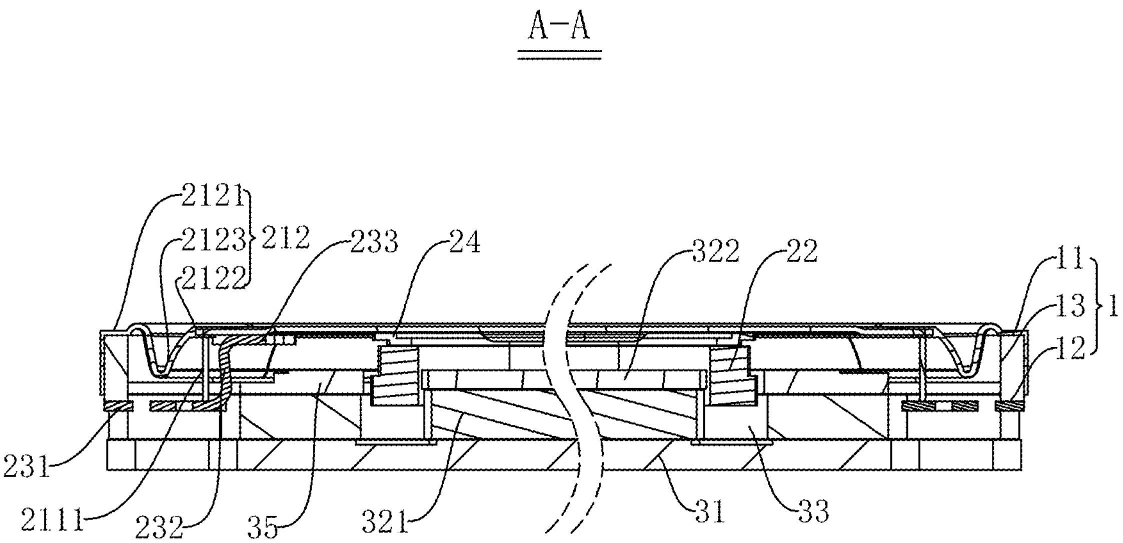
FIG. 3 is a cross-sectional view along the line A-A in FIG. 1.
Figure 4:
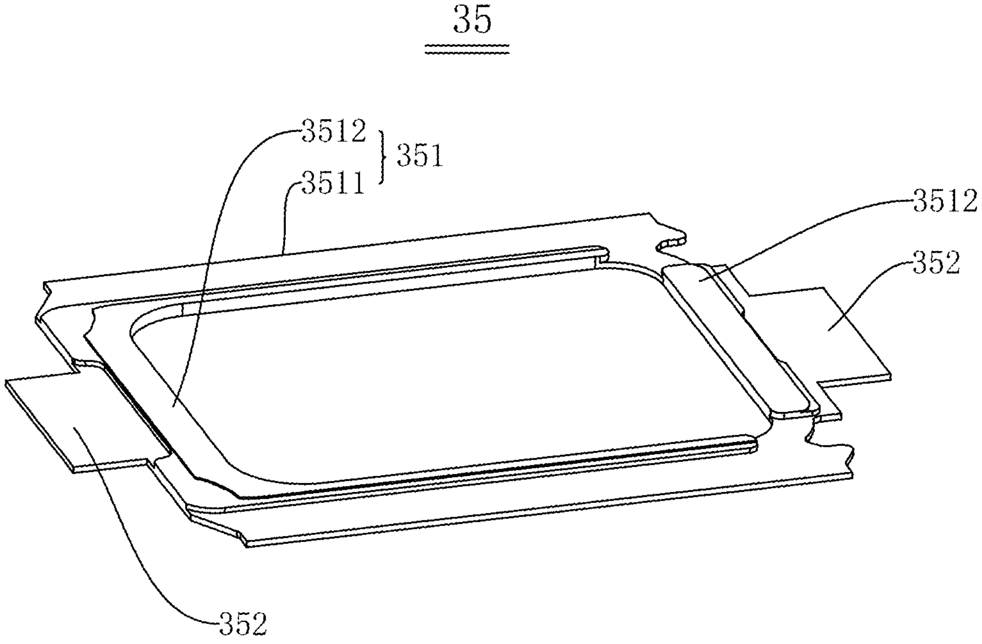
FIG. 4 is an isometric view of an upper plate of the speaker of the present disclosure.
Figure 5:
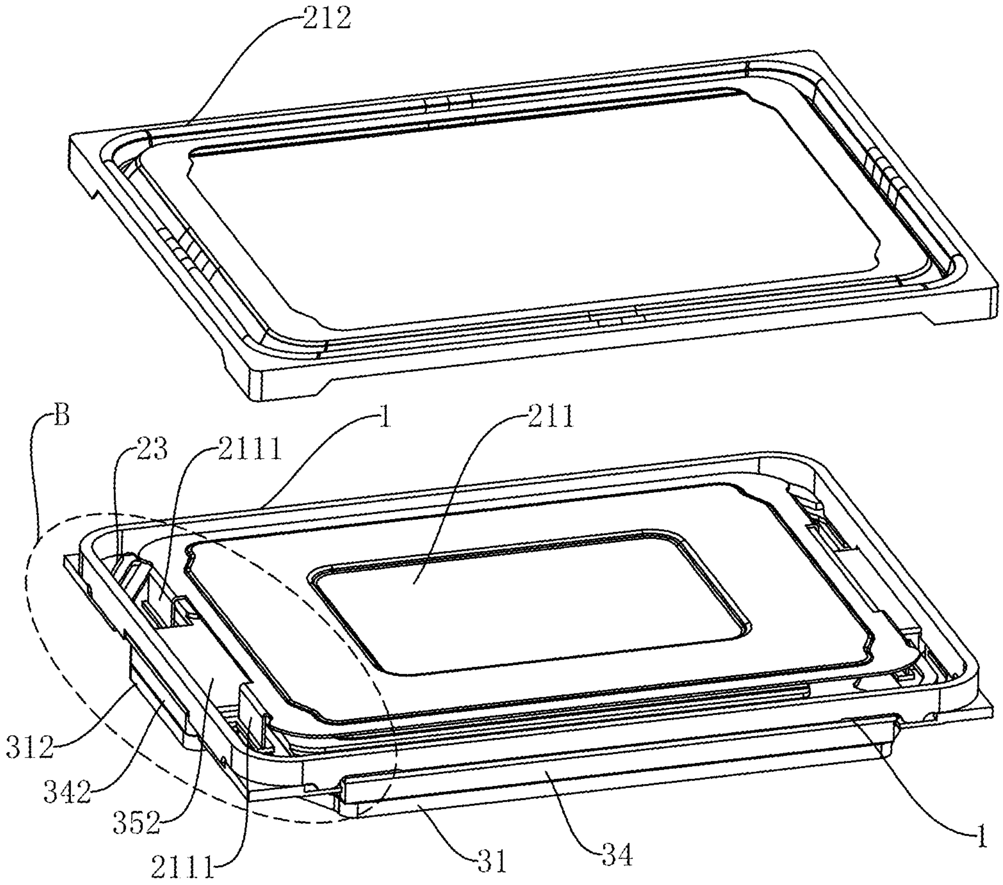
FIG. 5 is an exploded view of a partial of the speaker of the present disclosure.

As shown in FIG. 3, the vibration system 2 includes a diaphragm 21 fixed with the frame 1 and a voice coil 22 driving the diaphragm 21 to vibrate, the diaphragm 21 includes a dome 211 and a suspension 212 surrounding the dome 211, one end of the voice coil 22 is fixed with the dome 211 and the other end is suspended in the magnetic gap 33. The vibration system 2 further includes a skeleton 24, the voice coil 22 is fixed and connected with the dome 211 by the skeleton 24, in other embodiments, the voice coil 22 could also be directly fixed and connected with the dome 211, the suspension 212 includes a first fixed portion 2121 fixed with the frame 1, a second fixed portion 2122 fixed and connected with the dome 1, and a bending portion 2123 connected the first fixed portion 2121 and the second fixed portion 2122. When the voice coil is energized, the voice coil drives the dome vibrate and sound.

Optionally, the vibration system 2 further includes a flexible support member 23 fixed with the frame 1 and electrically connected to the voice coil 22, the flexible support member 23 includes two body portions 231 located at opposite sides of the first projection 352 in the direction of the two short axial sides 3512, a connecting portion 232 extending from an inner edge of each of two body portions 231 towards the dome 211, and a lead connecting portion 233 extending from the connecting portion 232 in a direction away from the body portion 231, the lead connecting portion 233 is fixed with the dome 211.

Figure 6:
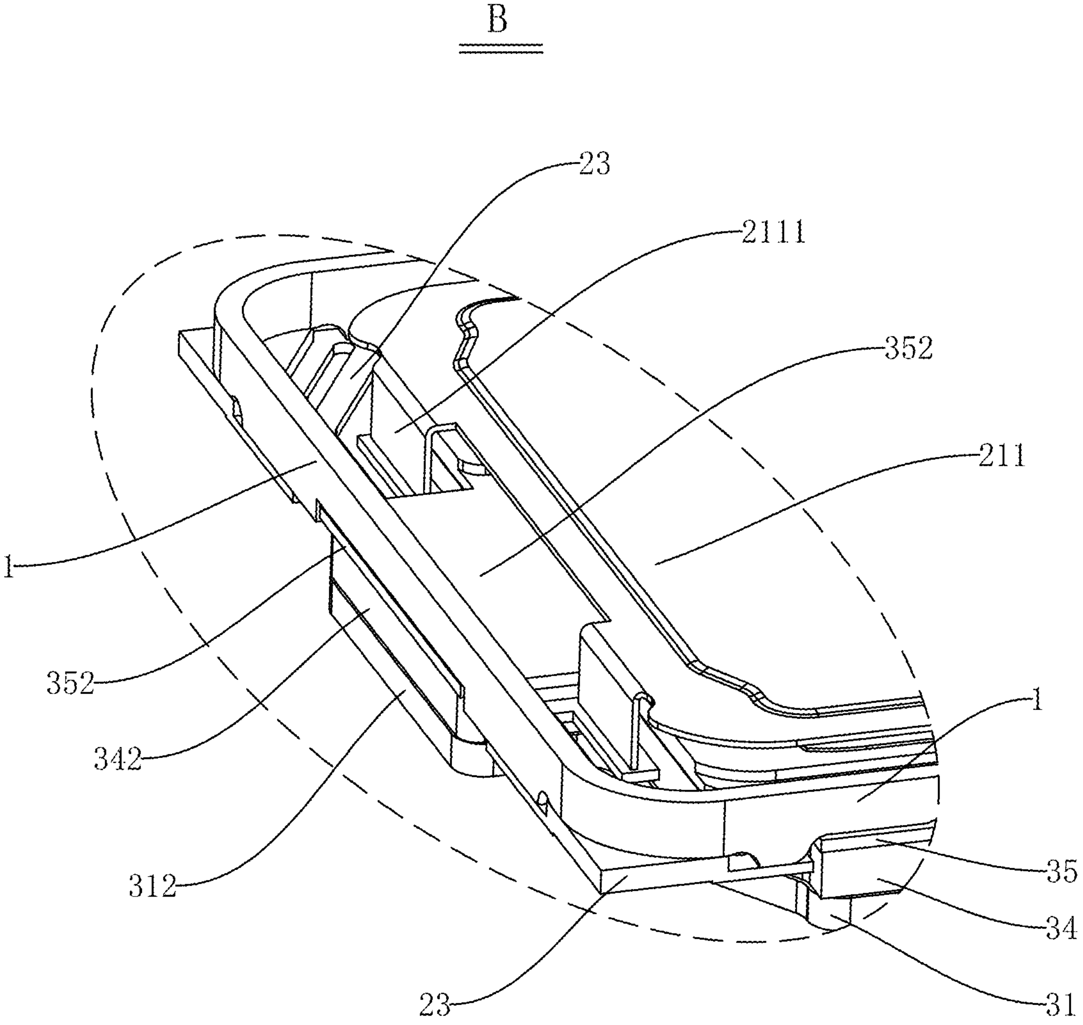
FIG. 6 is an enlarged view of Part B of FIG. 5.

Further, as shown in FIG. 6, the dome 211 further includes a supporting portion 2111 extending and curved from an outer edge of the dome 211 to the magnetic circuit system 3, the supporting portion 2111 abuts against the flexible support member 23, the supporting portion 2111 includes an opening portion **2111*a* avoiding the first projection 352, the first projection 352 passes through the opening portion 2111*a* and is fixed with the bottom surface 12**.

It should be noted that, it is a more preferred embodiment with the avoiding portion 14, the opening portion **2111*a*, and the two body portions 231**, which could make the structure of the speaker more compact and make the speaker satisfy the needs of miniaturization and thinness.

Compared with the related technology, the speaker of the present invention could meet the demand for miniaturization and thinness of the speaker while enhancing the strength of the short axis of the speaker and effectively avoiding the situation in which the magnet is damaged due to dropping of the speaker by extending the first projection portion fixed with the frame from the two short axis sides in the direction away from the main magnetic component.

It should be appreciated by those skilled in the art that various modifications are possible without departing from the spirit or scope of the present invention. The embodiments illustrated above should not be interpreted as limits to the present invention, and the scope of the invention is to be determined by reference to the claims that follow.

What is claimed is:

1. A speaker comprising:

a frame;

a vibration system fixed with the frame; and a magnetic circuit system driving the vibration system to vibrate, comprising a lower plate, a main magnetic component fixed with the lower plate, a secondary magnetic component surrounding the main magnetic component for forming a magnetic gap, and an upper plate located on a side of the secondary magnetic component close to the vibration system and fixed with the frame; wherein the upper plate comprises a main body, the main body comprises two long axis sides extending in a direction of a long axis of the speaker and two short axis sides extending in a direction of a short axis of the speaker, the two long axis sides are opposite to each other, the two short axis sides are opposite to each other, the two long axis sides are fixed with the frame, at least one of the two short axial sides is provided with a first projection extending in a direction away from the main magnetic component, the first projection is fixed with the frame.

2. The speaker as described in claim 1, wherein the secondary magnetic component comprises a secondary magnetic body attached to the main body and a second projection extending from the secondary magnetic body in the direction away from the main magnetic component, the second projection is in correspondence with the first projection and attached to the first projection.

3. The speaker as described in claim 2, wherein the secondary magnetic body comprises two first secondary magnetic segments corresponding to the two long axial sides and two second secondary magnetic segments corresponding to the two short axial sides, the second projection is provided on at least one of the two second secondary magnetic segments.

4. The speaker as described in claim 2, wherein the secondary magnetic body is a one-piece magnet with ring shaped.

5. The speaker as described in claim 3, wherein the lower plate comprises a plate portion fixed with the secondary magnetic component and the main magnetic component, and a third projection extending from the plate portion in the direction away from the main magnetic component, the third projection is corresponding to the second projection and fixed and attached to the second projection.

6. The speaker as described in claim 1, wherein the frame comprises an upper surface, a bottom surface opposite to the upper surface, and a side wall connecting the upper surface to the bottom surface, the first projection and the two long axial sides are fixed with the bottom surface.

7. The speaker as described in claim 6, wherein the frame further comprises an avoiding portion recessed from the bottom surface to the upper surface for avoiding the first projection, the first projection is accommodated in the avoiding portion.

8. The speaker as described in claim 6, wherein the vibration system comprises a diaphragm fixed with the frame and a voice coil driving the diaphragm to vibrate, the diaphragm comprises a dome and a suspension surrounding the dome, one end of the voice coil is fixed with the dome and the other end is suspended in the magnetic gap.

9. The speaker as described in claim 8, wherein the vibration system further comprises a flexible support member fixed with the bottom surface and electrically connected with the voice coil, the flexible support member comprises two body portions located at opposite sides of the first projection in a direction of the two short axial sides, a connecting portion extending from an inner edge of one of the two body portions towards the dome, and a lead connecting portion extending from the connecting portion in a direction away from the body portion, the lead connecting portion is fixed with the dome.

10. The speaker as described in claim 9, wherein the dome further comprises a supporting portion bending and extending from an outer edge of the dome to the magnetic circuit system, the supporting portion abuts against the body portion, the supporting portion comprises an opening portion for avoiding the first projection, the first projection passes through the opening portion and is fixed with the bottom surface.

* * * * *